(12) United States Patent
Erasmus et al.

(10) Patent No.: US 8,071,146 B2
(45) Date of Patent: Dec. 6, 2011

(54) IN-SHELL PASTEURIZATION OF EGGS

(75) Inventors: Corinda Erasmus, Centurion (ZA); Mathys Johannes Rossouw, Cullinan (ZA)

(73) Assignee: CSIR, Pretoria (ZA)

( * ) Notice: Subject to any disclaimer, the term of this patent is extended or adjusted under 35 U.S.C. 154(b) by 1006 days.

(21) Appl. No.: 11/568,095

(22) PCT Filed: Apr. 22, 2005

(86) PCT No.: PCT/IB2005/001079
§ 371 (c)(1),
(2), (4) Date: Oct. 19, 2006

(87) PCT Pub. No.: WO2005/102064
PCT Pub. Date: Nov. 3, 2005

(65) Prior Publication Data
US 2007/0202224 A1    Aug. 30, 2007

(30) Foreign Application Priority Data
Apr. 22, 2004   (ZA) .......................... ZA200403085A

(51) Int. Cl.
*A23L 1/01* (2006.01)
(52) U.S. Cl. ......... 426/243; 426/521; 426/614; 426/523
(58) Field of Classification Search .................. 426/298, 426/243, 399, 407, 521, 614
See application file for complete search history.

(56) References Cited

U.S. PATENT DOCUMENTS 5,843,505 A * 12/1998 Davidson ...................... 426/298
2002/0028282 A1 * 3/2002 Vandepopuliere et al. ... 426/614
2004/0013774 A1 * 1/2004 Dibbs .......................... 426/241

FOREIGN PATENT DOCUMENTS

WO  WO9702751 A1  1/1997
WO  WO9933360 A1  7/1999
WO  WO03024249 A1  3/2003

* cited by examiner

*Primary Examiner* — Drew Becker
*Assistant Examiner* — Preston Smith
(74) *Attorney, Agent, or Firm* — Wood, Herron & Evans, LLP

(57) ABSTRACT

An in-shell egg pasteurization process (10) includes, in a temperature raising stage (16), raising the temperature of albumen of an in-shell egg predominantly by means of microwave radiation to a temperature between 57° C. and 60° C., the albumen temperature being raised at a rate which reduces at least once over time. Simultaneously, in the temperature raising stage (16), the temperature of an external surface of the egg is raised predominantly by means of external heat radiation or conduction to a temperature of between 57° C. and 70° C., or alternatively or in addition the egg surface temperature is allowed to rise to a temperature of between 57° C. and 70° C. as a result of the microwave radiation by inhibiting heat loss from the egg. Said temperatures are then maintained by means of microwave radiation and external heat radiation or conduction for at least some time.

9 Claims, 8 Drawing Sheets

IN-SHELL PASTEURIZATION OF EGGS

THIS INVENTION relates to the in-shell pasteurization of eggs. In particular, it relates to an in-shell egg pasteurization process and to an in-shell egg pasteurization installation. This invention allows the pasteurization of in-shell eggs already packaged in standard retail egg containers without the need for a liquid heat transfer medium (for example hot water) for treatment.

BACKGROUND

Eggs are a highly nutritious, inexpensive food commodity which is accepted by most cultures. The safety of eggs has become a global issue with emergence of the pathogen *Salmonella enteritidis* as a major hazard associated with the consumption of raw and semi-cooked eggs. By 1993 the occurrence of *Salmonella enteritidis* has reached epidemic proportions in many countries. Unlike others of the 2000 serovars of *Salmonella*, this organism infects the egg before the egg is laid, with the organism being transmitted to the ova or the albumen before the formation of the shell of the egg.

In the UK alone, there were 14500 confirmed human food poisoning cases caused by *Salmonella enteritidis* in 1991. In the USA, the consumption of shell eggs per annum is estimated between 50 and 65 billion eggs, of which 1 in 10000 eggs is estimated to be infected with *Salmonella enteritidis* resulting in a 1 in 50 chance of an individual consuming a contaminated egg in any given year. Although there has been a reduction in the occurrence of *Salmonella enteritidis* since 1993, due to better poultry flock management, the organism has not been eradicated from poultry flocks, especially in countries where legislative controls are not as strict.

*Salmonella enteritidis* is killed by heat treatment and adequate cooking of eggs will thus kill the microorganism. However, the use of raw eggs in food as well as the consumption of partially cooked eggs is a reality, particularly in catering establishments and homes. Thus, in order to remove or reduce the risk of *Salmonella enteritidis* food poisoning, eggs should be pasteurized before distribution. Apart from having the effect of providing eggs substantially free of the risk of causing *Salmonella enteritidis* food poisoning, the shelf life of pasteurized eggs will also be significantly increased.

The infections of laying hens with *Salmonella enteritidis*, and the resultant contamination of egg contents, have resulted in a marked increase in human salmonellosis since the mid 1980's. The route of infection for *Salmonella enteritidis* is transovarian, whilst the route of infection for other serovars is trans-shell.

Both mechanical and chemical inhibitors restrict the growth of *Salmonella enteritidis* and other trans-shell contaminants in the albumen of fresh eggs. Fresh albumen is highly viscous and organised to confer biological structure to the egg contents, holding the vulnerable yolk away from the shell and its membranes. Fresh albumen contains factors inhibitory to the growth of microorganisms. These include lysozyme, which is an antimicrobial against Gram-positive bacteria, and conalbumin (ovotransferrin), which binds metallic ions making $Fe^{+++}$ unavailable to the organisms. Additional inhibitors include ovoflavoprotein, which binds riboflavine, and anti-trypsin factors such as ovoinhibitor. As the albumen ages, it becomes less viscous and less inhibitory. The deterioration of the vitelline membrane around the yolk allows leakage of yolk contents into the albumen triggering off rapid multiplication of surviving organisms in the albumen. Temperature of egg storage is a key factor in determining the rate of albumen aging.

The control of *Salmonella* and spoilage organisms in whole shell eggs is multi-faceted. High general *Salmonella* infection rates in poultry and sub-clinical ovarian infection in laying hens have been attributed to such factors as intensive farming, forced moulting practices and use of contaminated animal by-products as dietary protein supplements. About 30% of eggs are sent for breakage and processing into egg products for the food processing industry. Pasteurization practices are well established for these egg products and aim to reduce the loads of *Salmonella* by around 5 logs. The principle source of *Salmonella* on eggs for breakage is fresh fecal matter on the shells and loads can be high in newly pooled fresh egg contents. Pooled yolks, pooled whole egg and pooled albumen are pasteurized at different temperatures reflecting the differences in thermal stability of the egg products.

The pasteurization of whole shell eggs is much more problematical than the pasteurization of egg products and must balance the required reduction of target organisms against the maintenance of albumen quality.

Table 1 provides some information on the composition and characteristics of egg albumen and Table 2 provides more information on the characteristics of the various proteins in egg albumen:

TABLE 1

DESCRIPTION AND CHARACTERISTICS OF PROTEINS IN EGG ALBUMEN

| | Protein | Albumen proteins (%) | Isoelectric points | Molecular weight | Denaturation temperature [1] | Characteristics |
|---|---|---|---|---|---|---|
| i. | Ovalbumin | 54 | 4.5 | 45 000 | 84.0 | Phosphoglycoprot=ein |
| ii. | Ovotransferrin | 12 | 6.1 | 76 000 | 61.0 | Binds metallic ions |
| iii. | Ovomucoid | 11 | 4.1 | 28 000 | 79.0 | Inhibits trypsin |
| iv. | Ovomucin | 3.5 | 4.5-5.0 | $5.5$-$8.3 \times 10^6$ | — | Sialoprotein, viscous |
| v. | Lysozyme (G1) | 3.4 | 10.7 | 14 300 | 75.0 | Lyses some bacteria |
| vi. | G2 globulin | 4.0 | 5.5 | $3.0$-$4.5 \times 10^4$ | 92.5 | — |
| vii. | G3A globulin | 4.0 | 4.8 | — | 55.0 at pH 9 | — |
| viii. | Ovoinhibitor | 1.5 | 5.1 | 49 000 | — | Inhibits serine proteases |
| ix. | Ovoflavoprotein | 0.8 | 4.0 | 32 000 | — | |
| x. | Ovomacroglobulin | 0.5 | 4.5 | $7.69 \times 10^5$ | — | Strongly antigenic |
| xi. | Cystatin | 0.05 | 5.1 | 12700 | | Inhibits thiol proteases |
| xii. | Avidin | 0.05 | 10 | 68 300 | | Binds biotin |

[1] In water or buffer

TABLE 2

DESCRIPTION OF THE CHARACTERISTICS OF EGG ALBUMEN PROTEINS

| | Protein | Description |
|---|---|---|
| (i) | Ovalbumin | This is the predominant protein in albumen. It is a phosphoglycoprotein and the only albumen protein to contain free sulfhydryl group. Ovalbumin is readily denatured by mechanical stress (e.g. shaking). This is referred to as surface denaturation. Ovalbumin is thermally resistant. Ovalbumin is converted to S albumin, a more heat stable protein, during egg storage. The conversion is prevented by oiling the eggs. The denaturation temperature of native ovalbumin and S ovalbumin are reported 84.5 and 92.5° C. |
| (ii) | Conalbumin (Ovotransferrin) | This is a glycoprotein that contains no phosphorus or free sulfhydryl groups. Fifteen disulphide bonds maintain the quaternary structure. Conalbumin is more heat sensitive than ovalbumin but less susceptible to surface denaturation. It is reported to be stable at 57° C. for 10 minutes at pH 9. Di and trivalent metallic ions are bound by conalbumin. Two atoms of $Fe^{+++}$, $Al^{+++}$, $Cu^{++}$ and $Zn^{++}$ per molecule of protein form stable complexes with conalbumin above pH 6. These complexes are red, colourless, yellow and colourless respectively. Complexes of conalbumin with metallic ions are resistant to thermal denaturation and proteolytic attack. The iron binding properties of conalbumin are suggested to be responsible for its anti-microbial properties. |
| (iii) | Ovomucoid | Ovomucoid is a heat resistant glycoprotein that contains no tryptophan. Ovomucoid is a trypsin inhibitor. Chicken ovomucoid is classified as a single headed inhibitor, i.e., each molecule of ovomucoid binds with only one molecule of trypsin (serine proteinase). Turkey ovomucoid is double headed and duck ovomucoid triple headed. The protein is denatured at 80° C. at pH 9. |
| (iv) | Ovomucin | Ovomucin is a sulphated glycoprotein that may contribute to the gel like structure of thick white in the form of flexible fibres visible under electron microscopy. The amount of ovomucin in the thick white is four times greater than in thin white. Ovomucin in solution is resistant to heat between pH 7.1 and 9.0 at 90° C. for two hours. Ovomucin and lysozyme in solution can interact to form a water-insoluble complex. Much of the interest in ovomucin has arisen from its possible roles in maintenance of the gel structure of thick egg white and in the process of egg white thinning. Contradictory hypotheses have been advanced for the egg white thinning mechanisms. |
| (v) | Lysozyme | Lysozyme is an albumin enzyme that has a lytic action on bacterial cell walls, particularly Gram positives. Lysozyme hydrolyses the Beta (1-4) linkages between N-acetylneuraminic acid and N-acetylglucosamine. In egg white, the enzyme is 50 times more heat sensitive than in phosphate buffer. In egg white heated to 63° C. for 10 minutes, lysozyme is inactivated as the pH rises above pH 7. It has been suggested that its role in egg white may be more important in maintaining gel structure than as an anti-microbial. |
| (vi) | Ovoglobulins | The globulin fraction consists of three proteins, G1, G2 and G3. G1 is lysozyme. G1 and G3 are glycoproteins with excellent foaming properties. G3 is also the most heat sensitive of all the albumen proteins and foaming properties of pasteurized eggs is a critical quality parameter. |
| (vii) | Ovoinhibitor | Ovoinhibitor is a proteolytic enzyme inhibitor capable of inhibiting trypsin and chymotrypsin as well as a variety of fungal and bacterial proteases. |
| (viii) | Ovoglycoprotein | This glycoprotein is an acidic glycoprotein that comprises 1% of the egg white proteins. Little is known in respect of its functionality in egg albumen. |
| (ix) | Ovoflavoprotein | All the riboflavin in egg albumen is bound in the flavoprotein in a 1:1 ratio. Ovoflavoprotein is sometimes referred to as the riboflavin binding protein. The major function of the riboflavin binding protein is presumably to ensure transfer of the riboflavin from the blood serum to the albumen. |
| (x) | Ovomacroglobulin | Ovomacroglobulin is a glycoprotein with inhibitory activity against diverse proteolytic enzymes such as trypsin, papain and thermolysin. |
| (xi) | Cystatin | Cystatin is an inhibitor of thiol proteinases such as ficin and papain. It is highly stable against denaturation. Since the isolation of cystatin from chicken egg white, a "super family" of cystatins have been isolated and characterized from mammalian tissues. It is suggested that certain cystatins may have not only the general role of protecting cells against uncontrolled activity of their own proteinases, but may have a more specific action against virus infections. This has led to research on cystatins, including egg cystatin, as possible agents for anti-viral chemotherapy. |
| (xii) | Avidin | Avidin is a glycoprotein that combines with biotin to form a stable complex incapable of absorption by the intestinal tract of animals. In addition to its physiological importance as a possible anti-nutrient due to its strong affinity for biotin, avidin has also been suggested to play a role as an anti-microbial. Inhibition of microbial growth may arise not only from the unavailability of avidin-bound biotin, but also from the ability to bind various Gram-negative and Gram positive bacteria. |

Table 1 is only a generalisation as there are many factors that will influence the rate and temperature at which a specific protein fraction will denature. One of the most important factors is the pH of the medium and the ionic strength. Significant differences are found between published values mainly due to differences in the pH or the ionic strength of the medium in which the protein fraction was heated. Of particular importance is the fact that globulin G3A becomes much more sensitive to denaturation than ovotransferrin at a pH above 9.0. This is significant as the ovotransferrin is generally regarded as the most heat sensitive protein. Whole shell eggs of one to two days old usually have pH ranges of more than 9.0, which creates a problem if ovotransferrin is used as the indicator protein for heat damage. During the pasteurization of liquid eggs, the pH and the ionic strength is usually changed by the addition of salts or buffers to create a more stable environment for the egg proteins. For example, it is known that at a pH of 7 the globulin G3A only starts denaturing at 60° C., while at a pH of 9, almost 50% of the globulin G3A is denatured when the contents have reached 60° C. Globulin G3A plays a major role in the turbidity that is first observed at the initial stages of heat treatment of eggs. The egg albumen is still liquid, but develops a "milky" or turbid appearance as the globulin G3A denatures starting at 55° C. Denaturation of the globulin G3A is immediate at 60° C. with 50% denaturation after 5 minutes exposure. As the target organism *Salmonella enteritidis* needs to be destroyed without damage to the egg proteins, it becomes clear that efficient heat transfer to the eggs is necessary in order to give maximum heat exposure to the microorganisms, but minimum heat exposure to the egg proteins.

Egg yolk proteins are generally more heat stable than albumen proteins. However, as the target microorganisms are inside the yolk, yolk temperature has to be raised high enough without damage to the albumen. This is a major problem with conventional systems or processes of which the Applicant is aware using water or steam as heating media from the outside of the eggs. By the time the yolk has reached critical temperatures to kill the *Salmonella enteritidis*, the albumen had been exposed for extensive periods to the heat, causing the occurrence of excessive amounts of precipitate giving the albumen a milky colour. As egg albumen is generally more heat sensitive than egg yolk, egg albumen should be used as the indicator protein for egg quality assessment after processing.

Albumen or egg white consists of four distinct layers: outer thin white, viscous or thick white, inner thin white and the chalaziferous layer. The total solids content is 11 to 13%. Protein is the major constituent with up to 1% carbohydrate. Free carbohydrate is around 0.5% as glucose, with the rest as glycoprotein (mannose and galactose). Table 3 provides information on the layer structure and moisture content of albumen:

TABLE 3

LAYER STRUCTURE AND MOISTURE CONTENT OF ALBUMEN

| Layer | % of albumen | | % Moisture |
|---|---|---|---|
| | Mean | Range | |
| Outer thin white | 23.2 | 10-60 | 88.8 |
| Thick white | 57.3 | 30 to 80 | 87.6 |
| Inner thin white | 16.8 | 1-40 | 86.4 |
| Chalaziferous (including chalaza) | 2.7 | | 84.3 |

Table 4 provides some information on the composition of albumen, yolk and whole egg:

TABLE 4

COMPOSITION OF ALBUMEN, YOLK AND WHOLE EGG

| Egg component | Protein (%) | Lipid (%) | Carbohydrate (%) | Ash (%) |
|---|---|---|---|---|
| Albumen | 9.7-10.6 | 0.03 | 0.4-0.9 | 0.5-0.6 |
| Yolk | 15.7-16.6 | 31.8-35.5 | 0.2-1.0 | 1.1 |
| Whole egg | 12.8-13.4 | 10.5-11.6 | 0.3-1.0 | 0.8-1.0 |

SUMMARY OF THE INVENTION

The present invention provides an in-shell egg pasteurization process that includes, in a dry temperature raising stage, simultaneously raising the temperature of albumen of an in-shell egg predominantly by means of microwave radiation to a temperature between 57° C. and 60° C. and the temperature of yolk of the in-shell egg by means of said same microwave radiation to a temperature higher than the temperature of the albumen, the temperatures being raised at a rate which reduces at least once over time by reducing a microwave power input to the in-shell egg. Simultaneously, during microwave radiation of the in-shell egg, in the dry temperature raising stage the temperature of an external surface of the egg is raised predominantly by means of external heat radiation or external heat conduction to a temperature of between 57° C. and 70° C., or alternatively or in addition the egg surface temperature is allowed to rise to a temperature of between 57° C. and 70° C. as a result of the microwave radiation by inhibiting heat loss from the egg. In a pasteurization stage, the temperatures are maintained by means of microwave radiation and external heat radiation or by means of microwave radiation and external heat conduction for a period of time sufficient to pasteurize the egg.

BRIEF DESCRIPTION OF THE DRAWNGS

A series of experiments, trials and tests were conducted to establish the efficacy of the method and apparatus of the invention and to establish experimental procedures. These are discussed in more detail below together with their results with reference, where applicable, to the accompanying drawings in which FIG. 1 shows a growth curve of *Salmonella enteritidis* (PT4) in egg yolk;

DETAILED DESCRIPTION

Figure 1:
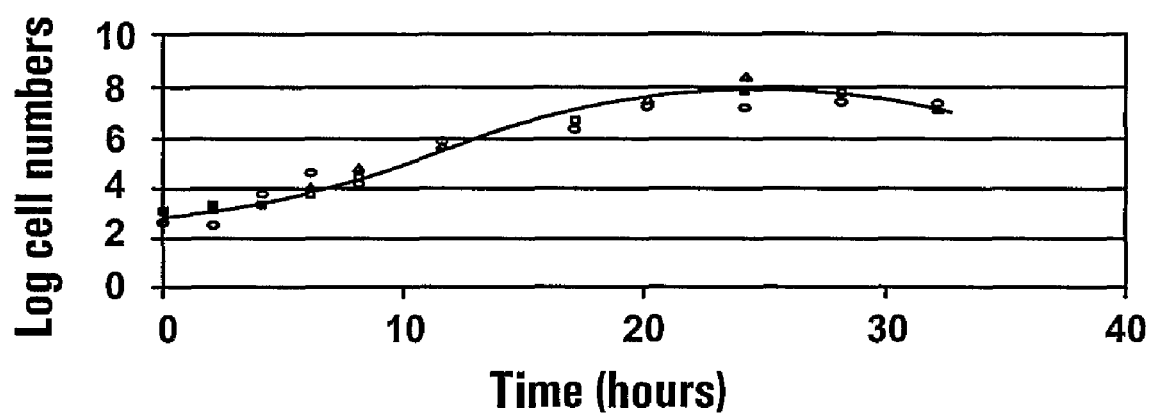

According to one aspect of the invention, there is provided an in-shell egg pasteurization process which includes in a temperature raising stage, raising the temperature of albumen of an in-shell egg predominantly by means of microwave radiation to a temperature between 57° C. and 60° C., the albumen temperature being raised at a rate which reduces at least once over time;

simultaneously, in the temperature raising stage, raising the temperature of an external surface of the egg predominantly by means of external heat radiation or conduction to a temperature of between 57° C. and 70° C., or alternatively or in addition allowing the egg surface temperature to rise to a temperature of between 57° C. and 70° C. as a result of the microwave radiation by inhibiting heat loss from the egg; and in a pasteurization stage, maintaining said temperatures by means of microwave radiation and external heat radiation or conduction for at least some time.

Said temperatures may be maintained by means of microwave radiation and/or external heat radiation or conduction for a period of at least 10 minutes. The temperatures may be maintained by means of microwave radiation and external heat radiation for a portion of the pasteurization time, and with external heat radiation or conduction for a remainder of the pasteurization time.

Inhibiting heat loss from the egg may be effected by keeping the egg in a heated atmosphere. In one embodiment of the invention, the external surface temperature of the egg is raised to a temperature of between 57° C. and 60° C.

Preferably, said temperatures are maintained for a period of at least 15 minutes, but less than 25 minutes, e.g. between 15 minutes and 20 minutes. During the pasteurization stage, microwave energy is added to the egg for at least a portion of the pasteurization period to prevent the albumen temperature from dropping as a result of moisture evaporation from the egg. Maximum log reductions in *Salmonella enteritidis* colony forming units and minimum heat damage were achieved in eggs at 15 minute holding times at target temperatures between 58° C. and 59° C.

Advantageously, the raising of said temperatures and the maintaining of said temperatures can be accomplished within about 40 minutes, even more advantageously within about 35 minutes, most advantageously within about 30 minutes, e.g. within about 22-25 minutes whilst providing a log reduction of at least 3, preferably at least 5, in *Salmonella enteritidis* colony forming units.

When a product is exposed to microwaves heat is directly generated inside the material, allowing rapid heating of the product. This differs from conventional heating processes where energy is transferred to the product from a hot element via conduction or convection or radiation, limiting the rate of heating. Another advantage of microwave heating is selective heating: certain materials are more susceptible to microwave heating than others and as a result the microwave energy is preferentially absorbed in that material. This means energy is not wasted in heating the surrounding material. Since there are no hot elements to be heated or cooled down in a microwave heating system the thermal lag in the system is small—the heat source (microwave field) can be turned on and off instantaneously.

Permittivity measurements on egg yolk and egg albumen in order to determine the dielectric constant, dielectric loss factor and power penetration depth into whole eggs showed that both albumen and yolk have very high dielectric loss factors, meaning that these materials are efficient absorbers of microwave energy. Power penetration depth is the distance from the material surface where 50% of the microwave power is already absorbed. Power penetration depth is about 15 mm in egg albumen and about 32 mm in yolk at 2.45 GHz (small-scale equipment frequency). Although these power penetration depths are on the short side, they are still long enough to allow for heat to be generated throughout the volume of an egg. It was, however, noted that a resonant effect may exist at 2.45 GHz, causing the field to be focused in the centre of the egg, and hence causing the centre to heat more rapidly than anticipated forming a so-called hot spot. Resonant effects are dependent on the shape of the egg and may be different for each egg. It may be advantageous to use a different microwave frequency, e.g. 915 MHz, to prevent the formation of a hot spot or to obtain more uniform heating of the eggs.

Preferably, a plurality of eggs is pasteurized simultaneously. The eggs may be at least partly packaged, e.g. located on an egg tray. Alternatively, the eggs may be arranged on a conveyor, e.g. a roller conveyor. Preferably, all the eggs are packaged and/or arranged in the same orientation, e.g. with their air sacks at the top or at the bottom.

The process may include selecting eggs for simultaneous pasteurization based on a predetermined egg weight range. Thus, eggs falling within a particular predetermined weight range may thus together be packaged at least partly and then together simultaneously be heated by microwave radiation and heat radiation or conduction. The egg weight range may be as large as about 10 g, or smaller at about 5 g, or even as small as about 3 g.

The albumen temperature may be raised at a rate which reduces along an approximate inverse logarithmic curve as a function of time. This may be achieved by using a slotted elongate wave guide and displacing the egg or eggs longitudinally past the wave guide.

The process may include preconditioning the egg or eggs to be at a desired initial temperature prior to the raising of the albumen and surface temperatures. Advantageously, this assists in ensuring accurate control of the raised and maintained temperatures of the albumen and egg surface.

The process may include a temperature hold stage, in which energy is supplied to the egg or eggs by means of heat radiation or conduction only, i.e. without microwave radiation. In the temperature hold stage, the energy may be supplied for a period of between about 1 minute and about 10 minutes, e.g. about 5 minutes.

The process may include a cooling stage, in which the egg or eggs are cooled to a temperature less than 30° C., preferably to a temperature less than 25° C., more preferably to a temperature of 20° C. or less.

According to another aspect of the invention, there is provided an in-shell egg pasteurization installation which includes a temperature raising stage comprising a microwave cavity or microwave cavity portion into which microwaves can be radiated;

a pasteurization stage comprising a microwave cavity or microwave cavity portion into which microwaves can be radiated;

heating means to provide radiant or conductive heat to an in-shell egg located in the temperature raising stage and to an in-shell egg located in the pasteurization stage; and displacement means to provide relative displacement between an in-shell egg and the microwave cavities or microwave cavity portions.

The microwave cavities may be connected directly so that, in use, an in-shell egg passes directly from the microwave cavity of the temperature raising stage into the microwave cavity of the pasteurization stage. Instead, a single microwave cavity may define said microwave cavity portions. Instead, the microwave cavities may be spaced. When the microwave cavities are spaced, the installation may include a stabilization stage between the microwave cavities. The stabilization stage may be heated, e.g. it may include the facility to generate or receive hot air, thereby to assist the temperature of an in-shell egg to stabilize.

Typically, an egg inlet end of the microwave cavity of the temperature raising stage and an egg outlet end of the microwave cavity of the pasteurization stage are provided with a choke to prevent or inhibit escape of microwaves from the microwave cavities through these ends.

The installation may include temperature sensing means to sense the temperature of the egg shell surface of an in-shell egg. The temperature sensing means may include an infrared temperature sensor.

The installation may include a holding stage, after the pasteurization stage, in which an in-shell egg can be kept in a heated environment for a period of time.

The installation may include a cooling stage which includes cooling means to cool an in-shell egg located in the cooling stage. The cooling means may include a chiller to provide chilled air to the cooling stage.

The displacement means may include a conveyer passing through both microwave cavities. Preferably, the conveyer passes through all the stages. The conveyer may be a variable speed conveyer.

The installation may include a microwave generator. Typically, a continuously radiating microwave generator is used to generate microwaves for both microwave cavities at a constant microwave power output. The installation may thus also include a coupler to divide the generated microwaves into two fractions, which are typically unequal fractions, a larger fraction being fed into the microwave cavity of the temperature raising stage and a smaller fraction being fed into the microwave cavity of the pasteurization stage. Typically, one or more wave guides are used to guide the generated microwaves from the microwave generator to the coupler and from the coupler into the microwave cavities.

The microwave cavity of the temperature raising stage and/or the microwave cavity of the pasteurization stage may be elongate and may include an elongate, longitudinally extending wave guide antenna. Preferably, the wave guide antenna includes a plurality of longitudinally spaced slots from which microwaves can be radiated, providing in use substantially uniform microwave radiation to an in-shell egg passing through the microwave cavity of the pasteurization stage.

The wave guide antenna of the microwave cavity of the temperature raising stage may be configured to provide a relatively high dosage of microwave radiation to eggs entering the microwave cavity of the temperature raising stage, thereby initially sharply raising the interior temperature of the egg albumen and yolk. The wave guide antenna of the microwave cavity of the temperature raising stage may be configured to provide an egg, passing through the microwave cavity of the temperature raising stage with progressively less microwave radiation, the received microwave radiation reducing along an approximate inverse logarithmic curve, ensuring that the temperatures of the albumen and yolk increase along an approximate logarithmic curve.

EXAMPLES

The Measurement of Egg Functional Quality

The functional quality of eggs is mainly determined by the quality of the various types of protein. Therefore, changes in the tertiary structure of the proteins leading to denaturation will cause changes in egg functional quality. As globulin G3A is the most heat sensitive protein, it was selected as the indicator protein for changes in egg quality. Globulin G3A affects foaming ability of egg white. Insufficient eggs were processed in order to do foam stability tests, but as the globulin G3A shows the development of turbidity due to denaturation, which provides an indication of decreases in foaming ability, the turbidity of the egg albumen after treatment gave a good indication of the damage. Turbidity can be measured using a number of available spectrophotometric tests or image analysis. Image analysis was selected as the initial screening test to evaluate the effect of treatment on egg albumen. The viscosity of eggs is also measured throughout the egg packaging industry as an indication of the age of the eggs. This is done by measuring the viscosity in Haugh units giving an indication of the stability of the different layers of the albumen. Older eggs become more "runny" causing a broken raw egg on a flat surface to spread out wider with a lower height. As Haugh units are the primary industry standard, it was selected as the second measurement of the effect of the pasteurization treatments on the eggs.

Selection of Test Organisms

The invention focuses on the control of the pathogen *Salmonella enterica* var. *enteritidis* in shell eggs. Of the strains of *Salmonella enteritidis* associated with eggs, Phage type 4 (PT4) is the most common and most studied strain. This strain was used throughout the experiments and tests although some information was obtained on the effect of the process of the invention on PT16 and PT19 strains. Microorganisms were treated when they were in their lag phase of growth—the most heat resistant phase. This created a worst-case scenario along with the selection of a heat resistant strain (which was used throughout the trials) and the consistent injection of the microorganisms inside the yolk of the eggs (as the albumen will have inhibitory effects).

Validation of the Growth of *Salmonella enteritidis* PT4 and Spoilage Organisms in Egg Growth of *Salmonella enteritidis* in Whole Shell Egg A culture of PT4 was grown up overnight and washed (×3) and harvested to give a pellet. The pellet was resuspended and adjusted to McFarland density standard 0.5 ($150 \times 10^6$ cfu) and serially diluted to approximately $10^3$ cfu. 0.1 mL was inoculated into the yolk of fresh eggs and the eggs incubated at 25° C. Sets of three eggs were removed at intervals and plate counts performed on the contents. A growth curve was constructed, as shown in FIG. 1 of the drawings.

Strains of PT16 and PT 19 were inoculated into the yolks of fresh eggs and showed an increase in cell numbers to around 108 to $10^9$/g of egg (stationary phase) over the same time period as PT4, indicating viability in egg.

Figure 2:
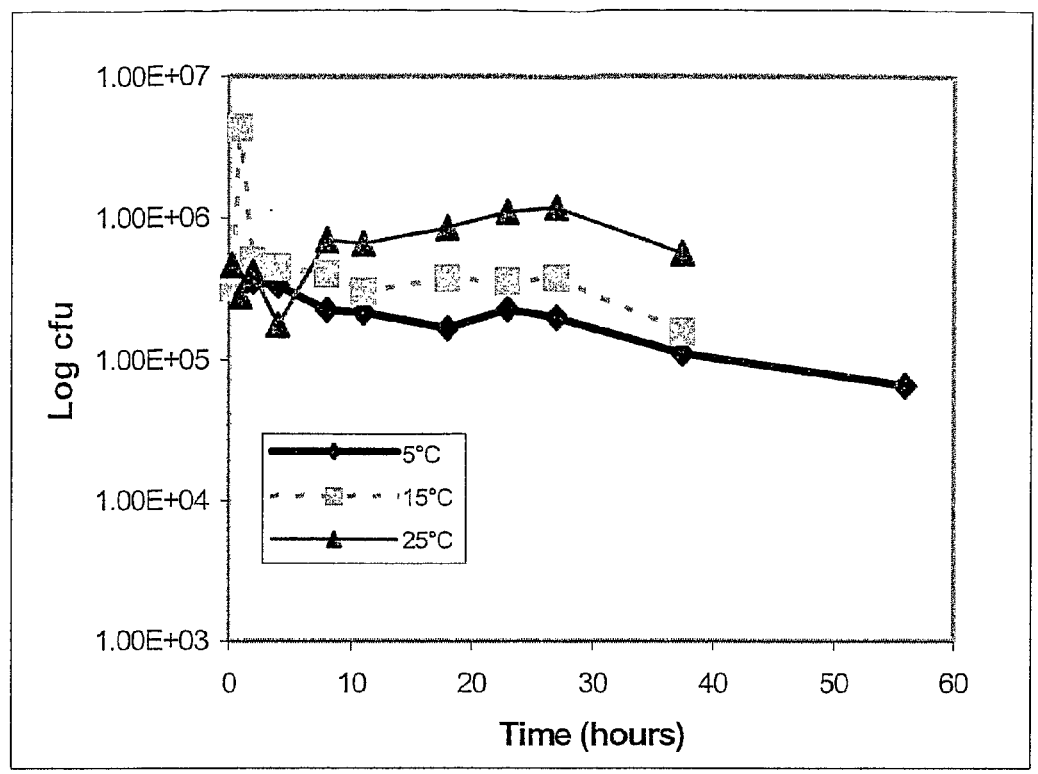
FIGS. 2 and 3 show growth curves of *Salmonella enteritidis* (PT4) respectively in pooled albumen and pooled egg yolk at various temperatures.
Figure 3:
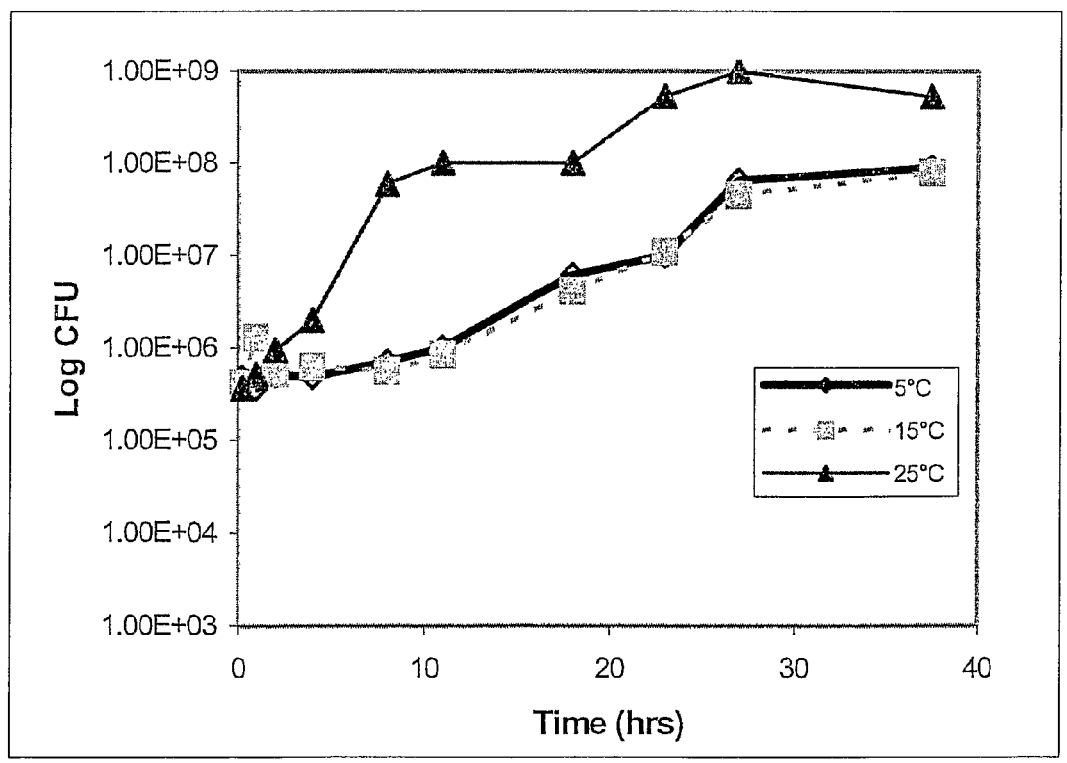

Growth of *Salmonella enteritidis* PT4 IN Pooled Albumen and Pooled Egg Yolk at Various Temperatures Six eggs were separated into yolks and albumen. The albumen was homogenised on a magnetic stirrer for 1 hour at a rate sufficient to mix the albumen without causing mechanical denaturation of the protein. The yolk was homogenised for 15 minutes. The albumen and the yolk were inoculated with a washed suspension of PT4 and the levels of PT4 evaluated over 2.5 days at a temperature of 25° C. The experiment was repeated at 15° C. and 6° C. Results are shown graphically in FIGS. 2 and 3. The strain of PT4 grew well in pooled egg yolk and appeared to be psychrotrophic, growing under 10° C. There was no significant growth of the organism at any of the three incubation temperatures in pooled albumen over the test period.

Figure 4:
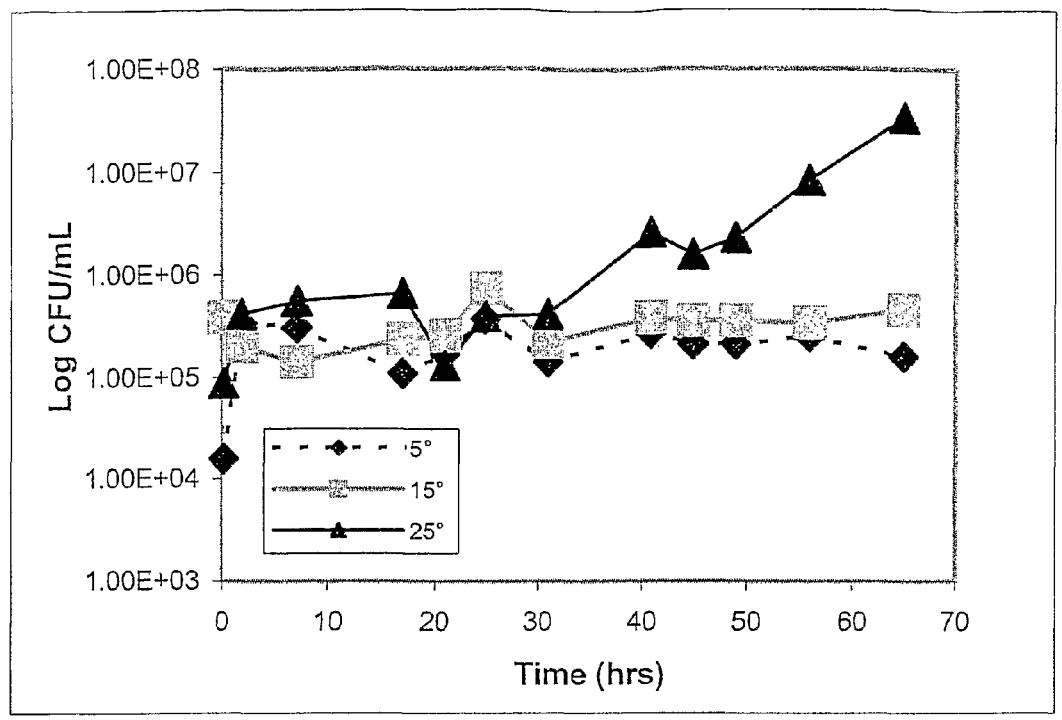
FIGS. 4 and 5 show growth curves of *Pseudomonas aeruginosa* respectively in pooled albumen and pooled egg yolk at various temperatures.
Figure 5:
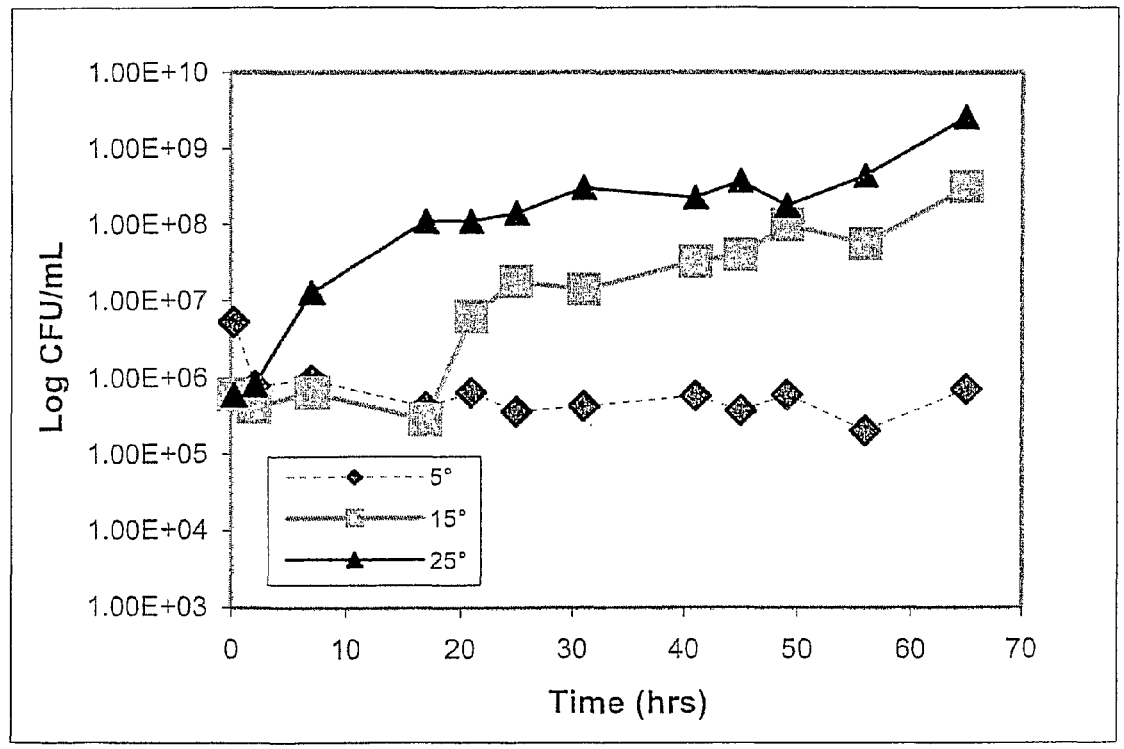

Growth of a Spoilage Organism, *Pseudomonas aeruginosa*, in Separated Pooled Albumen and Yolk Most spoilage organisms of whole eggs are non-enteric, Gram-negative bacteria producing coloured rots. Typically, spoilage is affected by pigmented *Pseudomonas* strains. The production of pigment is associated with the production of pyoverdine, which dechelates bound $Fe^{+++}$ and makes it available for microbial growth. A fluorescent *Pseudomonas* strain producing a bright green pigment was selected for the experiment. Pooled egg albumen and egg yolk were inoculated and incubated at 5° C., 15° C. and 25° C. with the *Pseudomonas* strain. Results are shown graphically in FIGS. 4 and 5. The *Pseudomonas* strain grew well in both pooled albumen and pooled yolk at 25° C. over the investigation period. The organism did not grow at 15° C. in albumen but did grow at 15° C. in yolk. The organism did not grow at 5° C. over the investigation period in either albumen or yolk. The selected strain *Pseudomonas aeruginosa* (ATCC 27853) was deemed a suitable test organism for validation of the process against spoilage organisms.

Inoculation Procedure for In-Shell or Whole Eggs

The egg yolk inoculation route was deemed to be more practical than the albumen inoculation route in unfertilized fresh eggs. Egg candling of fresh unfertilized egg did not differentiate the structural components of the egg, making the inoculation into albumen both difficult to perform and confirm. Growth of *Salmonella* and spoilage organisms is known to be faster in yolk than in albumen as confirmed experimentally. The lipo-proteins of yolk confer thermal resistance to the bacterial cells so that the reductions obtained in yolk possibly represent lower, least effective scenarios, for the effect of the process of the invention on whole shell egg where the site of infection, in naturally infected eggs, is predominantly the albumen.

The inoculation procedure followed the method of Grijspeerdt (Grijspeerdt, K, Herman, L, Inactivation of SE during boiling of eggs. *Int. J. Food Micro.* 82, 13-24). Overnight cultures of the test organism were grown up in tryptone soya broth. The culture was harvested by washing (×3) in saline producing a washed pellet, whereafter the washed pellet was suspended in saline and diluted to a McFarland standard of 0.5. The washed suspension (0.2 mL) was inoculated into yolks of fresh weighed eggs (within 1 gram range) and the series incubated overnight. At the start of each microwave trial, six eggs of the series were removed and counts performed to ascertain the stationary phase count per g of pooled egg content. The mean log count was determined. The remaining eggs in the series were subjected to the microwave test procedure. After heating by microwave radiation, the eggs were broken open and the condition of the albumen assessed. The contents were homogenised by stomaching in saline for 30 seconds and plate counts performed on the contents. The log reduction in cell numbers was calculated from the mean of the counts of the untreated series.

Microwave Apparatus

A roughly cubic microwave cavity was attached to a 2 kW variable power supply to provide a microwave apparatus or oven. An aluminium stirrer was mounted in the microwave cavity in front of a microwave wave guide inlet into the cavity. The stirrer caused deflections of the microwaves and resulted into an even spread of the microwave field. An egg was placed with its sharp end facing downwards on a paper cup and the spot inside the cavity was marked with a water resistant marker. Each egg was treated at exactly the same spot in order to eliminate variation that may occur as a result of position differences. An optic fiber temperature sensor attached to a data acquisition system was inserted into each egg. A small hole was drilled into the top end of each egg for the probe to be inserted. The aim was to insert the probe in the middle of the egg and at the same height from the top each time. The temperature of the inside of the egg was then measured and recorded using software supplied by FISO Technologies (Canada) attached to a computer. The objective of the temperature recordings was to establish the processing conditions needed in order to treat the eggs without overheating, but at the same time sufficiently destroying the target microorganisms (*Salmonella enteritidis*). Eggs were cooled after processing by leaving them on a laboratory bench. With the above set-up, one egg could be processed at a time.

Eggs of the same mass differ significantly in shape and it gave rise to problems with the location of the hot spot inside the eggs, which formed during microwave radiation of the eggs. If a probe of the same length is used every time, the tip of the probe where the sensor is will be in a different position from the bottom of the egg for different eggs. It gave rise to two significantly different detected temperature slopes. With the probe at the egg hot spot, egg internal temperatures could be controlled adequately to produce processed eggs without albumen damage. However, when the probe missed the hot spot, eggs were produced with coagulated spots inside as the temperature at the hot spot increased according to the fast slope, while the PID controller could only detect the slow slope. It was extremely important to establish during the first few seconds of each treatment whether the probe was actually in the hot spot or not. It was however shown that eggs can be processed consistently if the hot spot measurements are accurate. Based on the general trends in the data, it was generally concluded that the rate of heating at the egg hot spot is similar for each egg and the position of the hot spot does not influence this heat rate.

Pasteurization Trials

Flash Pasteurization Without Hot Air Blanket

Pasteurization of the eggs was effected by irradiating the eggs with microwaves until a target inside temperature was reached. Target temperatures varied from 58 to 60° C. The microwave treatment was stopped when the temperature was reached.

Pasteurization With and Without PID Control in Hot Air Blanket

It was found that the flash pasteurization treatment did not achieve sufficient killing of the microorganisms and it was ascribed to the low temperature of the egg shells after the treatment. In order to allow for more controlled heating, an air heater was attached to the microwave apparatus. Air temperatures of 56-64° C. were achieved and the treatments were repeated using a simultaneous combination of microwave radiation and a hot air blanket. The hot air was mainly used to prevent heat loss from the surfaces of the eggs and did not have a substantial separate heating function as the heat transfer from the hot air to the insides of the eggs was slow in comparison with the speed of the microwave heating.

With PID Control

A PID controller was installed linked to the optic fibre temperature sensor inserted into the eggs. The PID controller could be set to achieve a specific target temperature and the controller was linked directly to the microwave power supply controller. With the PID controller, the hot spot temperature inside the egg could be controlled within 1 degree Celsius and allowed for the development of a controlled heating process. The objective was gradually to heat the egg by preventing the hot spot from overheating, but by allowing gradual conduction of the heat from the hot spot into the rest of the egg without allowing heat to escape from the surface of the egg (prevented by the hot air around the egg). Eggs could be heated to a surface temperature of more than 58° C. within 15 minutes, without overheating of the egg hot spot.

Figure 6:
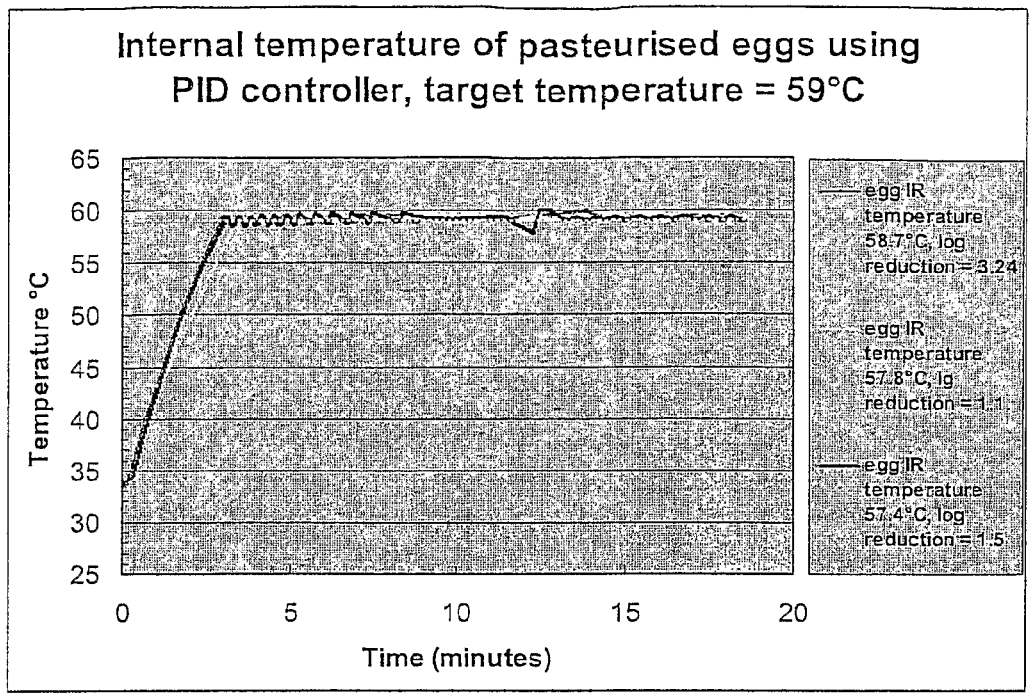
FIGS. 6, 7 and 8 show the internal temperature of eggs being pasteurized in accordance with the invention using a PID temperature controller, for various target temperatures and holding times.
Figure 7:
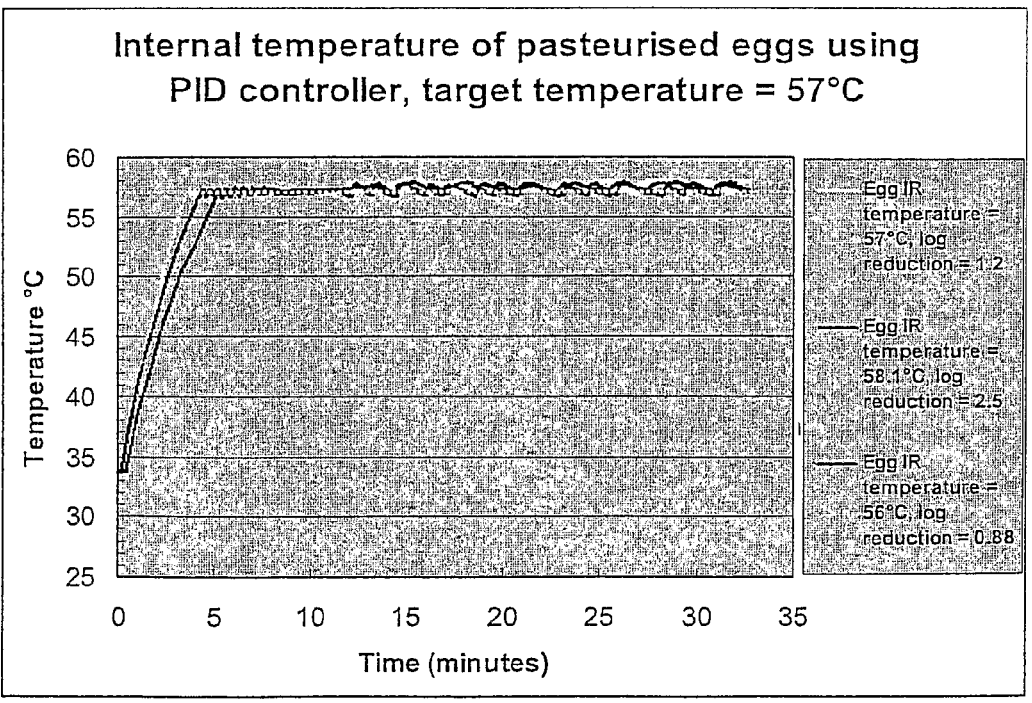
Figure 8:
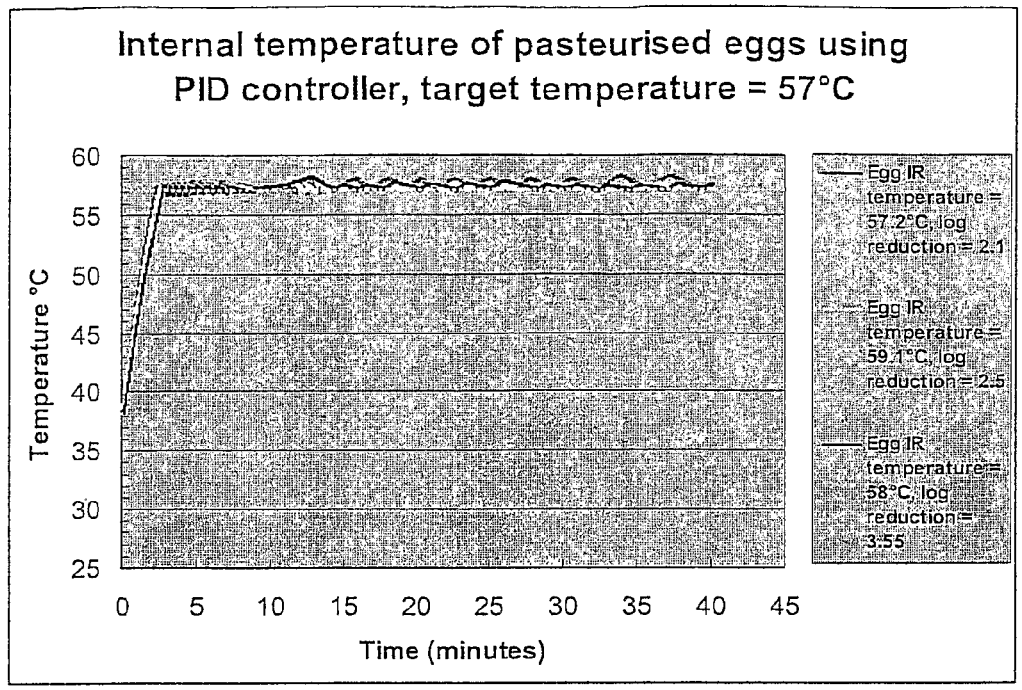

Full sample temperature profiles of eggs pasteurized using the PID controller are shown in FIGS. 6, 7 and 8. FIG. 6 shows the temperature profile of an egg heated to an internal temperature of 59° C. and held for 15 minutes, FIG. 7 shows the temperature profile of an egg heated to an internal temperature of 57° C. and held for 30 minutes and FIG. 8 shows the temperature profile of an egg heated to an internal temperature of 57° C. and held for 35 minutes. In each Figure, the internal logged temperature at the egg hot spot, the final egg surface temperature as detected by an IR temperature sensor and the log reduction of known quantities of *Salmonella enteritidis* are shown. Eggs did not show visible cloudiness or turbidity due to denaturation of the globulin G3A.

Trials were started with the egg target and holding temperatures set at 57° C. following encouraging results with inoculated eggs inserted into a water bath. It was found, however, that even after 35 minutes of treatment maximum *Salmonella enteritidis* log reductions of only 3.7 could be obtained. Further lengthening the egg holding times at these temperatures to 40 minutes resulted in the formation of precipitate and the eggs had a turbid appearance. It was then decided to experiment further with increased target temperatures. At a target temperature of 59° C., a maximum log reduction of 3.24 was already obtained after only 15 minutes holding time with no damage to the egg albumen. Egg surface temperatures as measured by the IR temperature sensor, hereafter referred to as IR temperatures, varied and it seems as if IR temperatures of at least 58° C. are required to achieve sufficient log reductions. IR temperature is measured after completion of the processing time and it indicates the egg shell surface temperature at the end of the process. IR temperature is greatly influenced by the temperature of the hot air around the eggs as it aids in the prevention of heat loss from the egg surface.

Pasteurization Without Temperature Probe

Based on various trials performed using the optic fibre probe inserted into the egg, a process was developed where the eggs could be heated without the need for the insertion of a probe. This was necessary to repeat the treatments, as would be the case in an industrial set-up, i.e. eggs will be processed without probes. The process set out below was developed for the laboratory scale equipment used and it allowed controlled heating of the eggs without inducing the formation of turbid white areas inside the eggs. In order for the process to be successful, the following criteria were shown to be important:

For a specific batch of eggs, eggs must be within 1 g weight difference from each other Eggs must be at the same start-up temperature (eggs were incubated overnight at 30° C.)

The microwave variable power supply must have sufficient levels of control

The hot air unit must have sufficient levels of control

The laboratory must be at a constant temperature if the oven cavity is not suitably insulated.

The process developed included the following steps, and the use of an infra red temperature sensor:

Incubate inoculated egg overnight in 30° C. incubator

Place egg in demarcated position inside microwave cavity. Close lid

Leave egg to equilibrate in hot air for 2 minutes

First heating cycle: Heat for 2 minutes with a power setting of approximately 18. Power unit display will fluctuate but must not exceed 44 W. The power reading will average 35 to 37 W Switch off for 2 minutes Second heating cycle: Heat for 90 seconds with power setting at 18 as for the first heating cycle Switch off for 2 minutes Third heating cycle. Heat for 8 minutes at a power setting of approx 4 (display must not exceed 17 W—it will average 12 to 14 W) to bring up to pasteurization temperature Switch off for 1 minute Pasteurization. Heat for one minute at the power setting established in the third heating cycle. Record the time (start of 'holding time'). Switch off for 3 minutes. Continue by heating for 1 minute followed by 3 minute rests until end of holding time of 20 minutes. (i.e. five on/off cycles)

Record temperature reading on the IR temperature sensor display at the end of the last three minute rest period (end of 20 minute cycle) and remove egg.

Figure 9:
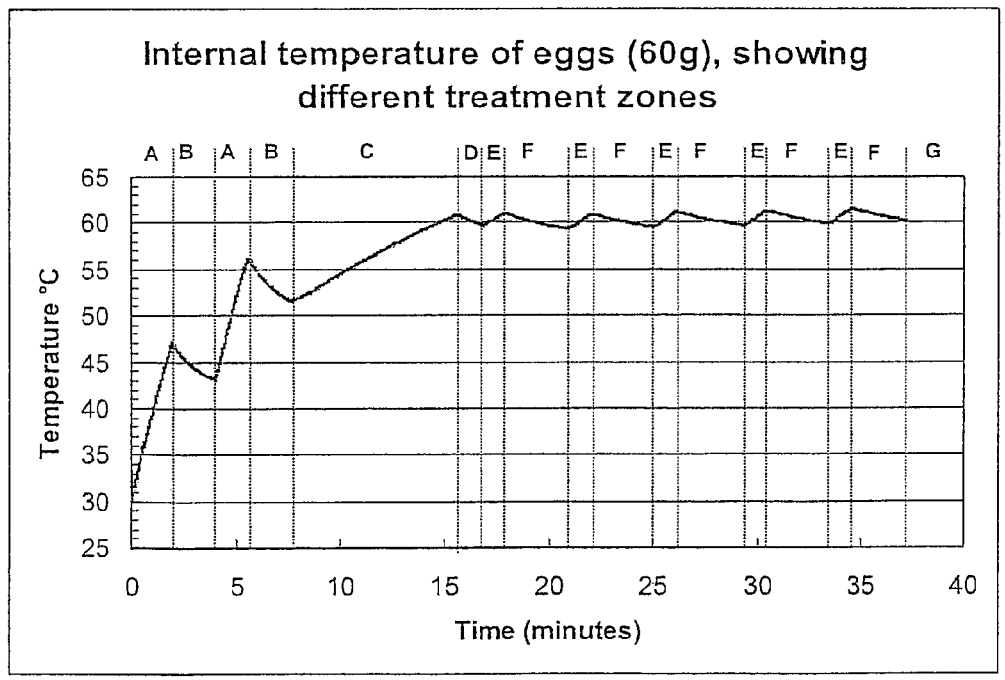
FIGS. 9 to 12 show the internal temperature of eggs being pasteurized in accordance with the invention without using a PID controller, for various variables and pasteurization outcomes.
Figure 10:
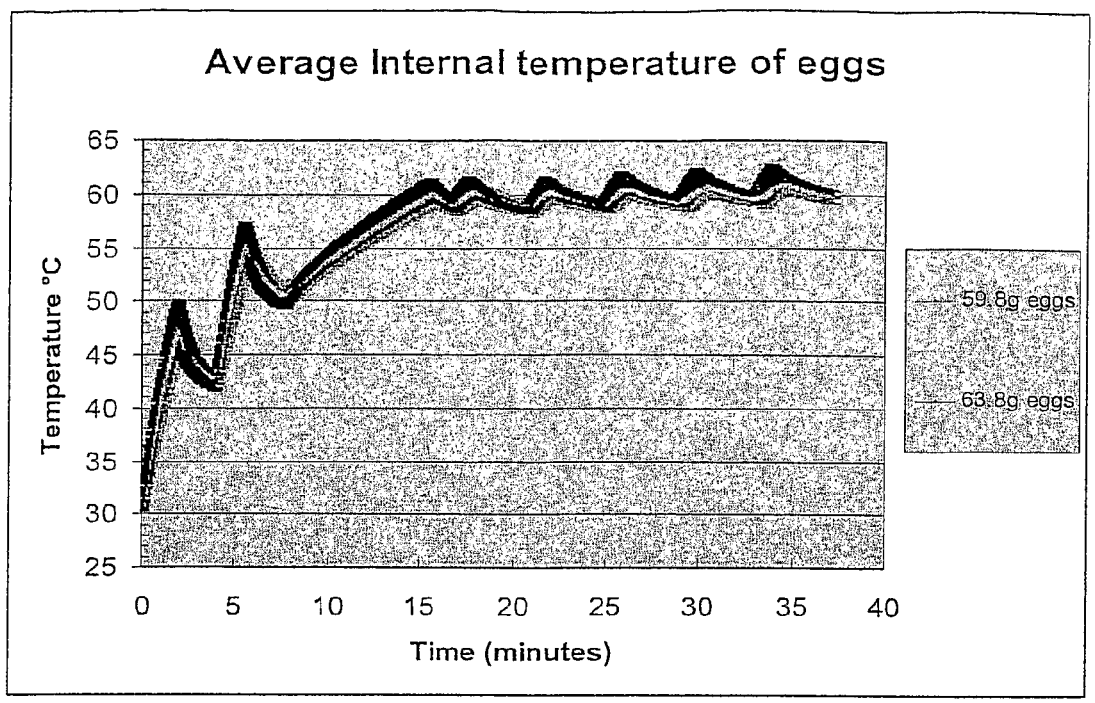
Figure 11:
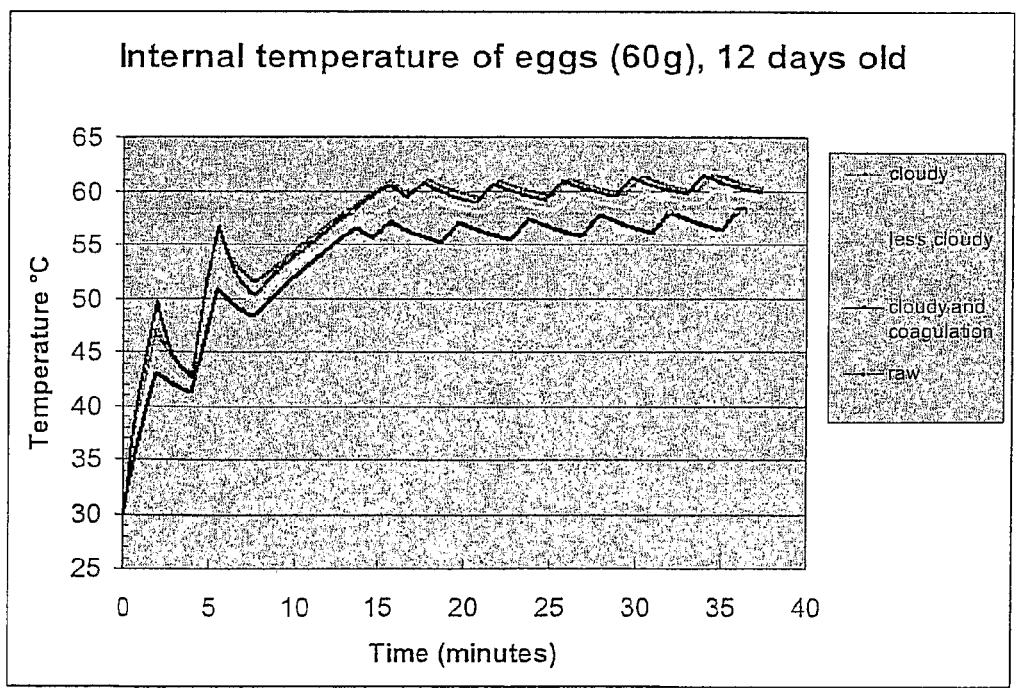
Figure 12:
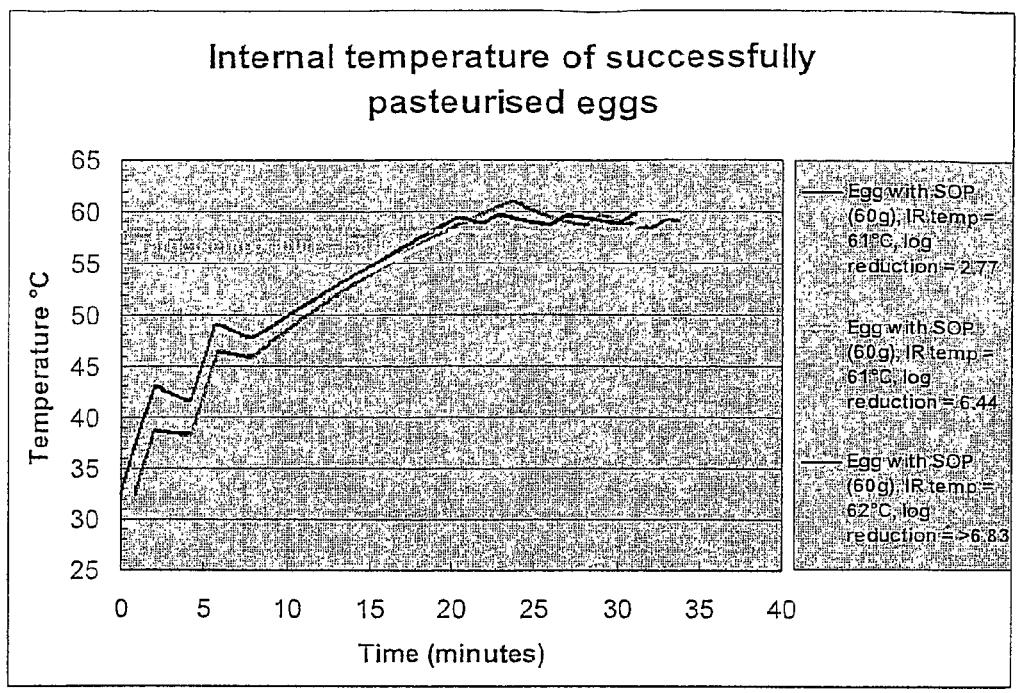
Figure 13:
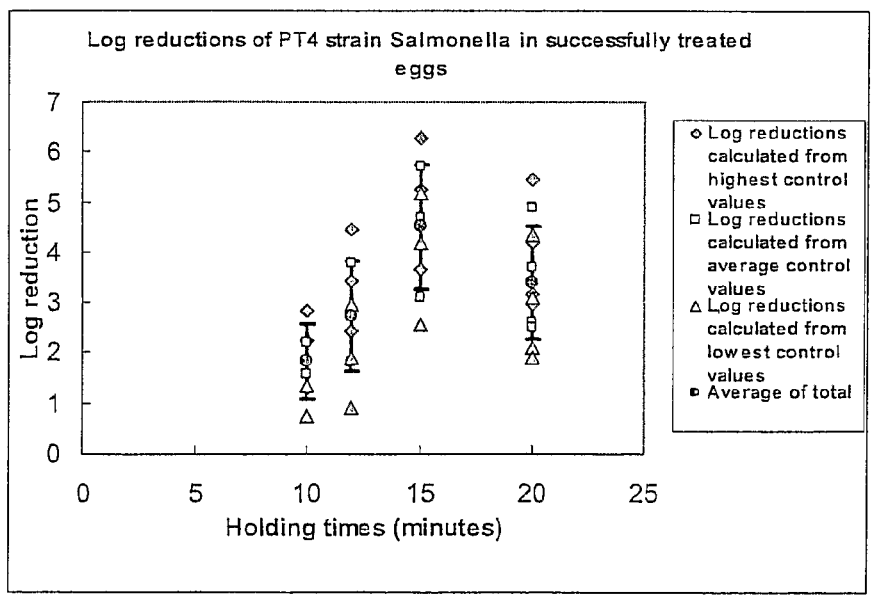
FIG. 13 shows a graph of average log reductions of eggs inoculated with *Salmonella enteritidis* and pasteurized in accordance with the invention without using a PID controller.

Using the base-line data obtained from the trials employing the PID controller, the above procedure was developed based on microwave power input, time and IR measurements of the egg surface temperature. The inside temperatures of the eggs were logged using the optic fibre probe, but the probe was disconnected from the PID controller. Results of temperature profiles, IR measurements and log reductions of Salmonella enteritidis are shown in FIGS. 9 to 13. FIG. 9 shows the basic temperature profile of the process. This profile stayed the same throughout the treatments except for shortening or lengthening the holding times. Treatment zones in FIG. 7 are as follows: A=fast heat at 44 W; B=power off; C=slow heat at 12-14 W based on IR reading; D=off (short rest); E=slow heat (12-14 W); F=off (long rest); G=cool. In FIG. 10 it can be seen that mass differences between eggs did not seem to have a significant effect on the detected hot spot temperatures within the range tested under these conditions. In FIG. 11 it is shown that the occurrence of precipitation or "cloudiness" is related to the egg internal temperatures and it was decided to focus on shorter processing times at higher temperatures (15 minute holding times at 58-59° C.) to achieve better egg albumen quality after the pasteurization process. In FIG. 12 the temperature profiles of successfully pasteurized eggs are shown. Log reductions per egg in excess of 6 were achieved, however, the occurrence of log reductions below 3 was a concern. The experiment was repeated several times in order to create the log reduction data shown in FIG. 13. One of the problems experienced in the trials is the variability of the inoculums injected into the eggs. Control samples consist of six eggs injected with the same inoculums as injected into the eggs that are processed. The problem is that the recovery and the control numbers of survived microorganisms cannot be done on the same egg. Amounts of microorganisms injected can vary by as much as 2 logs within a group of six eggs. This may partially account for the variability in the final measurement of survived microorganisms as shown in FIG. 13. In FIG. 13 the log reductions were calculated from average counts from the control as well as from the highest and the lowest values form the control. The method of calculation on its own showed an experimental error of 2 logs and taking into account other problem variables such as the air temperature control leading to variations in egg surface temperatures, the large variation in log reductions can be partially explained. It was, however, interesting to note that an increase from 15 to 20 minute holding times did not seem to reduce microorganism counts more efficiently. This trend was observed in other experiments as well. Log reductions in excess of 5 were achieved many times after 15 minute processing (the results of FIG. 12 are not pooled in FIG. 13 as well and many more sets of data were produced showing this trend). FIG. 13 is only a summary of four sets of data. All the eggs processed in FIG. 13 were described as "completely raw" i.e. precipitate/cloudiness/milkiness/turbidity was absent.

The first stages of heating (zones A, B, and C in FIG. 9) do not create problems and only if excessive overheating took place by accident, did any visible change occur in the egg albumen. Changes in the albumen were detected only after holding times of various lengths were added to the process. 15 Minute holding times produced less turbidity with most eggs completely clear. The turbidity will have an effect on the acceptability of the pasteurized eggs from a consumer viewpoint as well as its potential effect on the foaming properties of the albumen.

The effect of localised overheating on the appearance of egg albumen was also investigated. Eggs were heated at 110 W for 2.5 minutes to create localised coagulation. Several eggs subjected to the "slow slope" processing times were carefully opened at the bottom (sharp) ends after processing. It was found that the albumen coagulated in a tornado-shaped pattern starting from the base of the yolk. However, the initial coagulation did not start at the same point every time. The coagulation seemed to start at different positions on the bottom half of the yolk. No yolks were coagulated—only the attached albumen sections. It seems as if the hot spot is in this position—between the bottom of the yolk and the bottom of the egg and it develops from the yolk downwards in various positions. It was difficult finding the hot spot with an inserted probe as the probe is inserted in the middle of the egg. However, the processing conditions were designed according to the temperature sensitivity of the hot spot and it is hypothesised that the heat rate at the hot spot will be the same no matter what the position. As treatments could be repeated under controlled conditions without the need to insert a temperature probe, it seems as if this hypothesis holds true and can be used as a base line for the design of a larger-scale unit. It was established by inserting the probe into the yolk and albumen respectively (by removing the top portion of an egg and covering it again by a separate shell cap), that the heat rates between yolk and albumen away from the hot spot were similar. The formation of the hot spot can possibly be due to resonance effects of the microwaves inside the egg and although only qualitative data could be obtained, it seems as if eggs with a sharply pointed bottom end develop these hot spots easier as they could be created quicker and more consistently than round-bottomed eggs. In general terminology, the side of the egg opposite the air sac is the bottom and the air sac is located at the top. Eggs were found that were very irregular in shape, while others were found where the top and bottom shapes were similar (no distinction could be made between the top and the bottom). It thus appears as if egg shape will also influence the treatment process and not only mass.

The Applicant initially expected that eggs could be heated with microwaves only without the need to maintain the eggs in a heated environment. Although eggs with an acceptable appearance and with no albumen damage were produced using microwave radiation only, log reductions of the target microorganisms *Salmonella enteritidis* were surprisingly inadequate (1 log reduction or less). The simultaneous use of microwaves and hot air to prevent heat loss from the egg surface is in contrast surprisingly effective. In fact, egg surface temperature after processing apparently influences the pasteurization efficiency of the process of the invention. Another surprising result was that the eggs cannot be held in a hot air environment alone for the targeted holding time (15-20 minutes) even if eggs with a particular internal temperature are placed in hot air of the same temperature. The egg internal temperatures decreased and it was found that low intensity microwave energy had to be added to the eggs continuously during the holding time as well. This reduction in temperature during holding can be ascribed to evaporation of moisture from the egg surface (for example, eggs at 58° C. placed in a hot air environment of 58° C. will lose 2° C. in temperature every three minutes due to evaporation of moisture form the shell). It was found that eggs lost up to 0.3 g of moisture during each treatment. The addition of mineral oil to the surface of the eggs will reduce this effect, but will not eliminate it completely leaving the need for a combined low energy microwave/hot air holding unit. It is thus not possible to pasteurize eggs with microwaves alone until an egg shell (outer surface) temperature of 58° is reached. Even after hour long holding times with air temperatures at 20-25° C. during microwaving alone, surface temperatures only reached 52° C.

Figure 14:
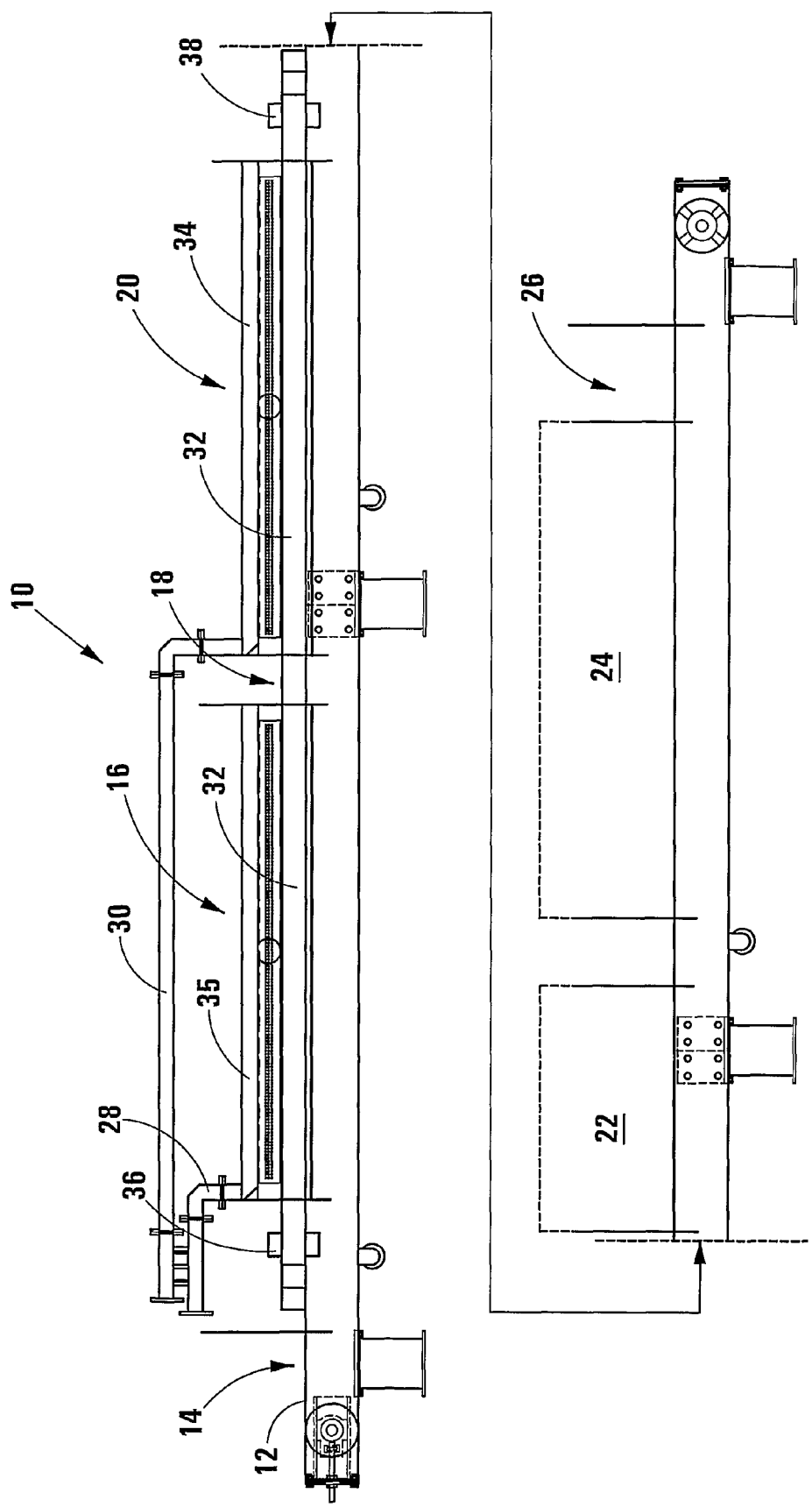
FIG. 14 shows a diagram of one embodiment of an in-shell egg pasteurization installation in accordance with the invention.

The invention will now be illustrated further with reference to FIG. 14 of the drawings, which shows a diagrammatic drawing of a small capacity in-shell egg pasteurization installation in accordance with the invention.

Referring to FIG. 14 of the drawings, a small capacity in-shell egg pasteurization installation is generally indicated by reference numeral 10. The installation 10 includes displacement means, in the form of a conveyor belt 12 which passes through a loading stage 14, a temperature raising stage 16, a stabilization stage 18, a pasteurization stage 20, a holding stage 22, a cooling stage 24 and an unloading stage 26.

The conveyor belt 12 is a silicon belt. Advantageously, a silicon belt is both microwave and food compatible and is easily cleaned. The conveyor belt 12 is driven by a variable frequency AC motor with a reduction gearbox (not shown) providing the conveyor belt 12 with a minimum speed of 0.15 m per minute and a maximum speed of 0.3 m per minute, with an accuracy of ±0.004 m per minute. This provides a pasteurization rate of between about 3 eggs per minute and about 6 eggs per minute. The length of the conveyor belt 12, from the loading stage 14 to the unloading stage 26, is about 6.1 m.

The installation 10 includes a microwave generator (not shown) and a 10 dB coupler (not shown) to divide the generated microwaves into two fractions. The microwave generator has a maximum microwave output of 2000 W and a minimum microwave output of about 50 W and operates at a frequency of 2.45 GHz. The coupler is connected to a wave guide 28 and a wave guide 30 to guide the generated microwaves from the microwave generator to the temperature raising stage 16 and the pasteurization stage 20.

The temperature raising stage 16 and the pasteurization stage 20 each include a microwave cavity 32 into which the generated microwaves are radiated in use. The pasteurization stage 20 includes an elongate longitudinally extending wave guide antenna 34 with a plurality of longitudinally spaced slots from which microwaves can be radiated. Similarly, the temperature raising stage 16 includes an elongate longitudinally extending wave guide antenna 35 with a plurality of longitudinally spaced slots.

A microwave choke 36 is provided at an inlet end of the temperature raising stage 16 and a microwave choke 38 is provided at an outlet end of the pasteurization stage 20.

Both the temperature raising stage 16 and pasteurization stage 20 each have a dedicated air heater (not shown). Each air heater comprises a flow restrictor, a fan and a heater box and is controlled with a PID controller. A PT100 sensor (not shown) is used to measure and control the air temperature. These temperature sensors are located where the heated air enters the temperature raising stage 16 and the pasteurization stage 20 respectively. The air heaters each have a capacity of 7 m$^3$ per hour with a temperature range from ambient to 70° C. and an accuracy of ±0.5° C.

The cooling stage 24 includes a standalone chiller (not shown) comprising a condenser, evaporator and circulation fan. The chiller has a capacity of 2 kW and produces chilled air at a temperature of 5° C.

In use, a six egg tray is placed on the conveyor belt 12 in the loading stage 14. The eggs pass through the choke 36 into the microwave cavity 32 of the temperature raising stage 16 where they are continuously radiated with microwaves to achieve a selected heating profile. A final target hot spot temperature for the eggs is 59.5° C. and, as will be appreciated, is determined by the conveyor belt speed and microwave intensity. For a conveyor belt speed of 0.15 m per minute, an exposure time of 600 seconds at a microwave power output of 900 W is required. As the eggs pass longitudinally through the temperature raising stage 16, the microwave power absorbed by the eggs drops along an inversely logarithmic curve whereas the temperatures of the egg albumen and yolk increase along a logarithmic curve. Simultaneously, the temperature of the external surfaces of the eggs increases as a result of the microwave radiation and the hot air fed into the temperature raising stage 16 so that the egg surface temperatures are in the region of 57° C.-60° C. When the eggs leave the temperature raising stage 16, they pass through the stabilization stage 18 for a period of about 1 minute, allowing the internal and surface temperatures of the eggs to stabilize.

The eggs leave the stabilization stage 18 to enter the pasteurization stage 20 where they are radiated with microwaves for a period of about 10 minutes. In the pasteurization stage 20, the internal and external temperatures of the eggs are maintained by the use of both microwaves and hot air. The eggs in the pasteurization stage 20 receive uniform microwave radiation along the length of the stage 20 from the slotted antenna 34.

On leaving the pasteurization stage 20, the eggs pass through the microwave choke 38 and then through the holding stage 22. The retention time of the eggs in the holding stage 22 is about 5 minutes. As the holding stage 22 is also supplied with hot air, the eggs in the holding stage 22 receive energy from the hot air, although they are not irradiated with microwaves in the holding stage 22.

The eggs leave the holding stage 22 to pass through the cooling stage 24, with a retention time of about 5 minutes in the cooling stage 24. In the cooling stage 24, the eggs are cooled by means of the chilled air to a final surface temperature of about 20° C., before the tray of eggs is removed from the conveyor belt 12 in the unloading stage 26.

It is an advantage of the invention, as illustrated, that eggs can be pasteurized when already packaged, and that the eggs can be pasteurized in a completely dry process. Eggs were pasteurized successfully in a static position similar to the position inside a packaged egg container. Therefore, it will be possible to treat ready-packaged eggs without the need to rotate or move individual eggs apart from transporting the eggs in their packages on a conveyor through the various zones of the pasteurization installation. The pasteurization is performed simultaneously using microwave energy and hot air allowing for significantly reduced processing times with subsequent improvement in the quality of the albumen when compared to conventional hot water bath systems. It is expected that the process of the invention will make it feasible to pasteurize large quantities of already packaged eggs, based on process parameters determined by characterizing the rate of heating of the egg hot spot, which was found not to be in the yolk as previously believed, but just below the yolk. Precise control of this hot spot allows for the production of eggs with less albumen damage.

The invention claimed is:

1. An in-shell egg pasteurization process which includes
   in a dry temperature raising stage, simultaneously raising the temperature of albumen of an in-shell egg predominantly by means of microwave radiation to a temperature between 57° C. and 60° C. and the temperature of yolk of the in-shell egg by means of said same microwave radiation to a temperature higher than the temperature of the albumen, the temperatures being raised at a rate which reduces at least once over time by reducing a microwave power input to the in-shell egg;
   simultaneously during microwave radiation of the in-shell egg, in the dry temperature raising stage, raising the temperature of an external surface of the egg predominantly by means of external heat radiation or external heat conduction to a temperature of between 57° C. and 70° C., or alternatively or in addition allowing the egg surface temperature to rise to a temperature of between 57° C. and 70° C. as a result of the microwave radiation by inhibiting heat loss from the egg; and
   in a pasteurization stage, maintaining said temperatures by means of microwave radiation and external heat radiation or by means of microwave radiation and external heat conduction for a period of time sufficient to pasteurize the egg.

2. The process as claimed in claim 1, in which inhibiting heat loss from the egg is effected by keeping the egg in a heated dry atmosphere.

3. The process as claimed in claim 1, in which said temperatures are maintained for a period of at least 15 minutes, but less than 25 minutes.

4. The process as claimed in claim 1, in which a plurality of eggs is pasteurized simultaneously and in which the eggs are at least partly packaged.

5. The process as claimed in claim 4, in which all the eggs are packaged in the same orientation.

6. The process as claimed in claim 1, which includes selecting eggs for simultaneous pasteurization based on a predetermined egg weight range.

7. The process as claimed in claim 1, in which the albumen temperature is raised at a rate which reduces along an approximate inverse logarithmic curve as a function of time.

8. The process as claimed in claim 1, which includes preconditioning the egg or eggs to be at a desired initial temperature prior to the raising of the albumen and surface temperatures.

9. The process as claimed in claim 1, which includes a temperature hold stage, in which energy is supplied to the egg or eggs by means of heat radiation or conduction only, i.e. without microwave radiation.

* * * * *